(12) United States Patent
Hsu et al.

(10) Patent No.: US 7,465,092 B2
(45) Date of Patent: Dec. 16, 2008

(54) BALL CHAIN

(75) Inventors: Ming-Che Hsu, Tainan Hsien (TW); Lih-Fen Chen, Tainan Hsien (TW)

(73) Assignee: Chieftech Precision Co., Ltd., Sinshih Hsiang, Southern Taiwan Science Park (TW)

( * ) Notice: Subject to any disclaimer, the term of this patent is extended or adjusted under 35 U.S.C. 154(b) by 276 days.

(21) Appl. No.: 11/343,034

(22) Filed: Jan. 30, 2006

(65) Prior Publication Data

US 2007/0110345 A1    May 17, 2007

(30) Foreign Application Priority Data

Nov. 11, 2005    (TW) .............................. 94139998 A

(51) Int. Cl.
*F16C 29/06*    (2006.01)

(52) U.S. Cl. .............................. 384/43; 384/45; 384/54

(58) Field of Classification Search ............. 384/43–45, 384/51, 470, 523–526, 576–577, 50, 54; 74/424.88

See application file for complete search history.

(56) References Cited

U.S. PATENT DOCUMENTS

| | | | | |
|---|---|---|---|---|
| 2,566,421 A * | 9/1951 | Lapointe | ..................... | 384/526 |
| 4,598,957 A * | 7/1986 | Shibayama | ................... | 384/51 |
| 5,033,878 A * | 7/1991 | Tsuji et al. | ................... | 384/576 |
| 5,295,749 A * | 3/1994 | Takahashi et al. | ........... | 384/568 |
| 5,593,064 A | 1/1997 | Meshberg | | |
| 5,772,338 A * | 6/1998 | Hillmann et al. | ............ | 384/470 |
| 5,927,858 A | 7/1999 | Agari | | |
| 6,247,846 B1 * | 6/2001 | Shirai | ...................... | 74/424.88 |
| 6,364,086 B1 * | 4/2002 | Blaurock et al. | ....... | 193/35 MD |
| 6,575,630 B2 * | 6/2003 | Blaurock et al. | .............. | 384/43 |
| 7,044,642 B2 * | 5/2006 | Liao et al. | ..................... | 384/45 |
| 7,178,982 B2 * | 2/2007 | Chin-Pei et al. | ............... | 384/51 |
| 2002/0090152 A1 * | 7/2002 | Shirai et al. | .................. | 384/45 |
| 2003/0185470 A1 * | 10/2003 | Lee | ............................. | 384/45 |
| 2005/0036721 A1 * | 2/2005 | Wu et al. | ...................... | 384/51 |

FOREIGN PATENT DOCUMENTS

| | | | | |
|---|---|---|---|---|
| DE | 10356170 B3 | * | 9/2005 | |
| EP | 989314 A1 | * | 3/2000 | |
| EP | 1327786 A1 | * | 7/2003 | |
| JP | 2001090731 A | * | 4/2001 | |

* cited by examiner

*Primary Examiner*—Marcus Charles

(57) ABSTRACT

A ball chain comprises a sequence of balls and an longitudinally elongated spacing chain having a sequence of holes thereon for receiving the balls. The spacing chain further includes a sequence of spacers interposed between the balls whereby the balls will be separated to each other, at least two longitudinally extended flexible strip and a plurality of transverse flexible connecting beam whose two ends respectively are connected to the longitudinal flexible strip, whereby the spacers attach to said connecting beam through an elastic member. The spacers can accordingly deflect and twist freely and the transverse flexible connecting beam can keep as long as possible and provide the best flexibility for being bent in various directions. Therefore, the ball chain can run in a three-dimensionally direction-chain recirculation channel smoothly and with low resistance.

9 Claims, 7 Drawing Sheets

BALL CHAIN

FIELD OF THE INVENTION

The present invention relates to ball chains, more particularly to a ball chain comprising a sequence of balls and an axially elongated spacing band that has a sequence of holes thereon for receiving the balls and the spacers that separate the balls whereby the ball chain can re circulate smoothly in a three-dimensional direction-change channel with low noises and resistance.

BACKGROUND OF THE INVENTION

A mechanism of motion comprises a moving part and a guiding part. The moving part and the guiding part comprise at least a raceway coupled and there exists a row of load-carrying balls rolling along the raceway coupled. For each raceway coupled the moving part further provide a return channel as well as a turn-around channel to form a recirculation passage, so that the ball chain can circulate in the recirculation passage and the moving part can therefore continue its slide motion on the guiding part without limit. To avoid collision between and the wear of the balls during the slide motion, a plurality of separators are provided among the balls so as to isolate adjacent balls from each other for reducing noises and frictional resistance, wherein the adjacent separators is formed to have un-uniform thickness so as to isolate the adjacent balls in an unequally spaced manner as disclosed in U.S. Pat. No. 5,927,858. However, because of the clearance between the balls and their neighboring separators, the separators are easy to get tilted, causing an interference with the passing channel and unsmooth running of the slide motion.

Another connecting chain of balls comprises a pair of strip-like connecting member and a multiple spacers, connected to said connecting member and interposed among respective rolling balls; wherein said spacers form a rosary-like shape for receiving the balls. Further, the connecting chain of balls is fabricated by molding flexible resin and able to deflect in the direction perpendicular to a plane defined by the connecting member. However, because of the rigidity of the band-like connecting chain in the transverse direction, the connecting chain cannot be bent effectively in that direction, which forbids effective three-dimensional bending.

To overcome the problem of unsmooth recirculation occurring when the ball chain bending is not on a plane perpendicular to the elongated surface of the connecting chain, linear motion mechanisms such as ball screws or linear guides, as disclosed by U.S. Pat. No. 5,593,064. In that patent, a ball connector comprises a number of balls arranged in one row at predetermined interval; and a flexible connector belt includes four belt members formed in a strip-like shape along peripheral faces of the balls and brought into contact with the plurality of balls; wherein the belt members are connected mutually with other ones of the belt members at intermediaries of the balls contiguous to each other and the connector belt is formed in a shape constrict in comparison with an outer diameter of the ball at positions of the intermediaries connecting the balls. The ball connector is accordingly easy to flex compliantly in any direction at the position and easy to absorb twist operated on the ball connector. This design allows more freedom for the ball connector being bent and twisted, and a smooth slide motion of the ball chain when it is bent deviated from the plane perpendicular to the elongated surface of the connecting chain. However, this invention, since the connector belt is formed in a shape constrict in comparison with an outer diameter of the ball at positions of the intermediaries connecting the balls, that only the top side of four belts falls in the guide grove of the recirculation channel and that the recirculation channel is at least composed of two parts, there must be an engagement section between the two parts, where misalignment could happen. Therefore, every time the top fringe of the four belts pass through the engagement section, they have to be realigned, or the ball connector is easy to get jammed. Moreover, to provide enough flexibility the connecting portion of the belt member should have certain longitudinal length and constriction, such will affect the number of the balls receiving the load and the spacer size negatively. Similarly, the rolling-element hold spacer disclosed by the U.S. Pat. No. 6,247,846 B1 comprises a thick hold section having spherical indents formed on both sides thereof, the thick hold sections being adapted to be interposed between rolling elements and thin bent sections for interconnecting only one thick hold section pair in which the rolling element is to be interposed. The thin bent section can be deflected or twisted in a curved portion of a rolling-element circulation path and the hold spacers which are adjacent to each other with a single rolling element interposed therebetween mutually perform pivotal movement around the rolling element, thereby enabling smooth circulation in three-dimensional change of direction of the rolling elements. However, since the hold spacers are moving independently in the recirculation channel, each of the balls will have to realign itself with the channel when passing through the engagement section between the parts of the recirculation channel, where misalignment could happen and may cause a unsmooth slide motion.

SUMMARY OF THE INVENTION

Accordingly, the primary objective of the present invention is to provide a ball chain that can be bent in three dimensions with a high degree of freedom, whereby it can slide smoothly and quietly along linear motion mechanism such as a ball screw and a linear guide. The ball chain comprises a row of balls and a spacing chain with a multitude of holes for housing the balls. The spacing chain further includes a row of spacers disposed between the balls for preventing the collisions between adjacent balls. The ball chain further comprise a pair of longitudinally extended thin flexible strips and a multitude of transversely extended flexible connecting beam interposed between the balls; both ends of the flexible connecting beam is connected to the longitudinal flexible strips, the spacers attach to the flexible connecting beam through an elastic member, whereby the transversely extended flexible connecting beam can keep as long as possible and provide the best flexibility for being bent in various direction, and whereby the spacers attached to the connecting beam through the elastic member can deflect or twist freely. Further, the spacers, slightly smaller than the diameter of the balls, have a larger contact area with the corresponding balls, whereby the contact pressure between a spacer and a rolling ball will be reduced. Further, each of the spacers has a groove whose clearance is large enough so that the bending of the corresponding transverse connecting beam will not interfere with the spacer.

There is at least a guiding groove within the recirculation channel for guiding the longitudinal flexible strips, whereby the ball chain can slide along an elongated guiding plane defined by the guiding grooves within the recirculation channel. When the recirculation channel is turned on a plane perpendicular to the guiding plane, the longitudinal flexible strips will be also curved two dimensionally along the guiding plane, and the flexibility of the longitudinal flexible strips will facilitate the bending of the ball chain, and therefore the balls will move smoothly with low resistance in the channel.

When the recirculation channel is turned in a way that the vertical planes to the guiding plane are no more lying on the same plane but displaced or tilted to each other, for example in the ballscrew or some linear guide design, as the ball chain is moving in the recirculation channel and the longitudinal flexible strip is inside and guided by the groove, the trajectory of the moving ball chain is accordingly three dimensional, and there will be relative displacement, bending, and tilting between the longitudinal flexible strips and the transverse flexible connecting beam. In the meanwhile, the spacers still have to be properly aligned to the balls. The different alignment of the strip, connecting beam and spacer require the deformations among them, so that they can be adjust to the curvature of the recirculation channel smoothly. This can be realized by the flexibility of the the strip and connecting beams themselves and the elastic member between the connecting beam and the attached spacer also. Thereby, a full three dimensional curving of the ball chain can be performed with high degree of freedom and the ball chain, having its flexible longitudinal strips inside and guided by the grooves and its spacers properly aligned to the rolling balls, runs smoothly in the recirculation channel. The spacing chain can be made by nylon, TPE resin or rubber . . . etc. fabricated by injection molding to achieve its flexibility.

The various objects and advantages of the present invention will be more readily understood from the following detailed description when read in conjunction with the appended drawings.

DETAILED DESCRIPTION OF THE PREFERRED EMBODIMENTS

Figure 1:
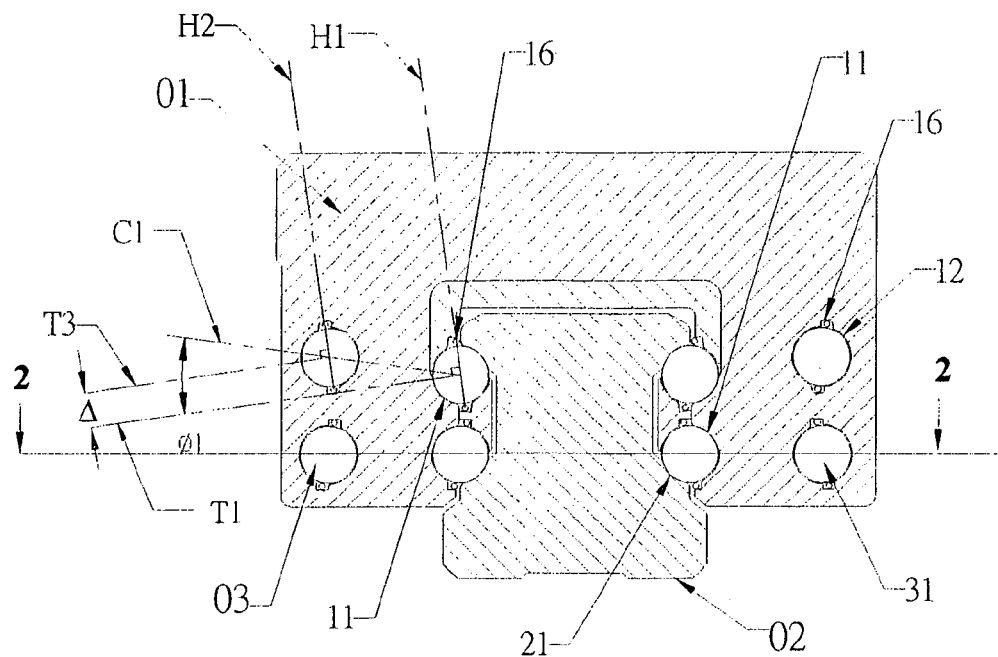
FIG. 1 shows a linear guide for applying the present invention, which is a front cross-sectional view thereof wherein the return channel is not on the plane T1 perpendicular to the spacing chain in the load zone channel.
Figure 2:
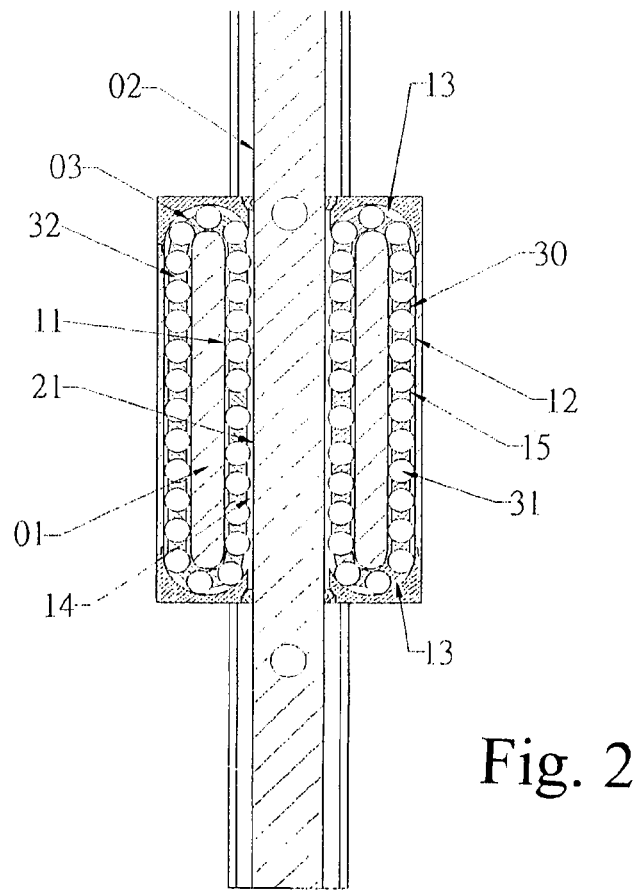
FIG. 2 is the A-A cross sectional view of FIG. 1.

Referring to FIGS. 1 and 2, a linear guide comprises a moving part 01, a guiding part 2 and a plurality of ball chains 03. The moving part 01 has a plurality of longitudinally extended tracks 11, an about longitudinal arranged return channels 12 nearby each of the track 11. The tracks 11 and the return channels 12 are respectively connected by turnaround channel 13 on both ends. The guiding part 2 provides a track 21 in the position opposed to each of the tracks 11, to form a load zone channel 14. Said return channel 12, turnaround channel 13 and the load zone channel 14 form a recirculation channel 15 altogether.

Figure 3:
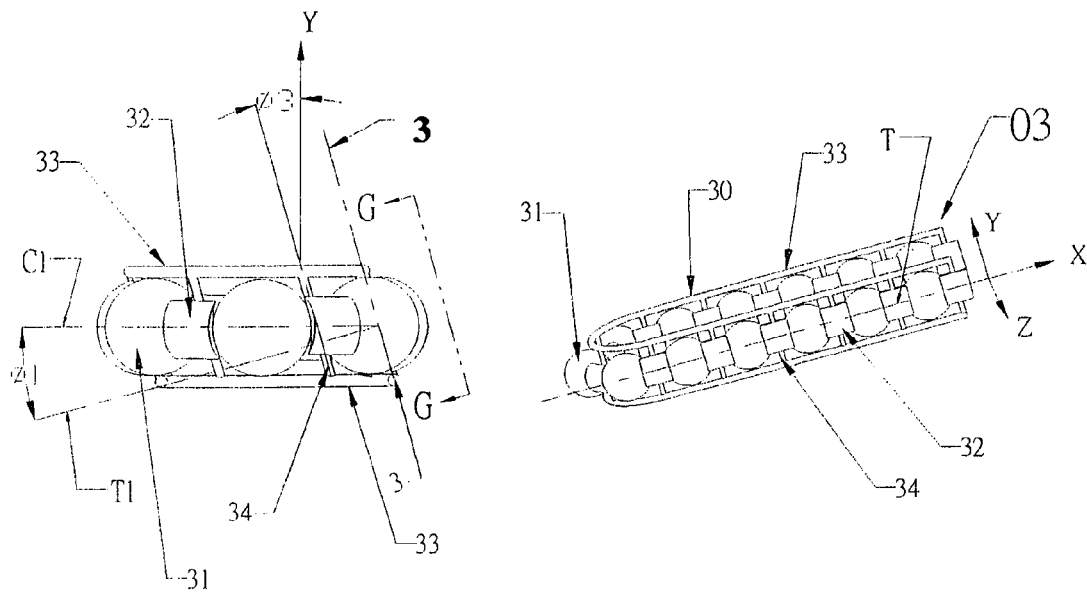
FIGS. 3(A) and 3(B) are front views of the spacing chain disclosed by the present invention in a recirculation channel having a return channel, turnaround channel and a load zone channel and its G-G perspective view.
Figure 4:
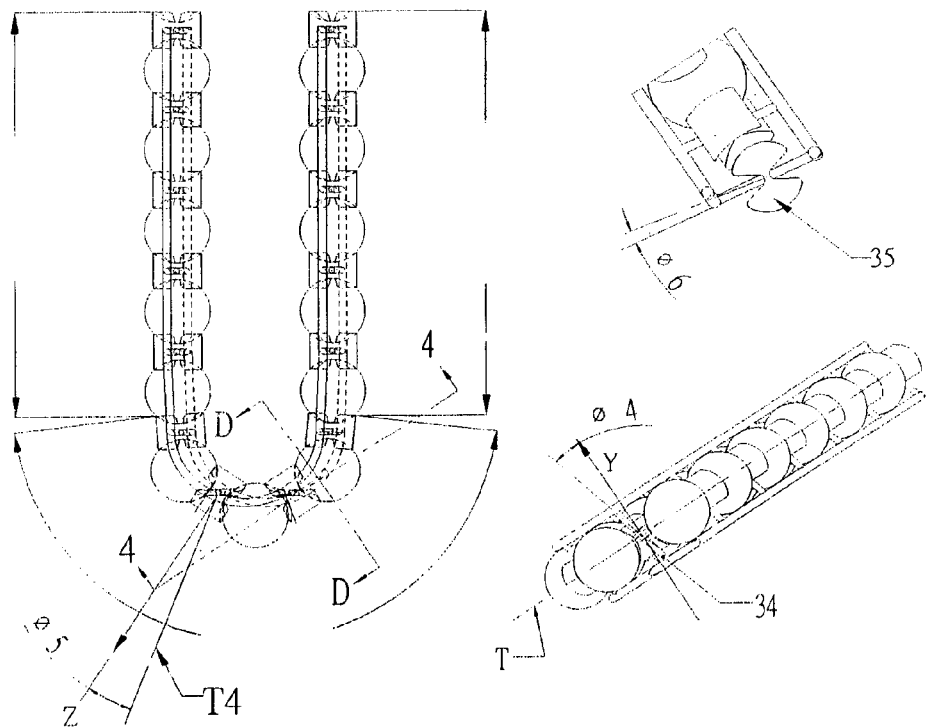
FIGS. 4(A) and 4(C) are top views of the spacing chain disclosed by the present invention in a recirculation channel having a return channel, turnaround channel and a load zone channel and its D-D and E-E perspective view.

Each of the ball chains 03 comprises a row of balls 31 and a longitudinally extended spacing chain 30. Each of the spacing chain 30 has a multitude of hole for receiving the balls 31. Each of the ball chains 03 moving in a corresponding recirculation channel 15 wherein the balls 31 in the load zone channel 14 roll on the track 11, 21 and carry the load, turnaround in the turnaround track 13 and return in the return channel 12. Thereby, the moving part 01 is sliding along the guiding part 2 indefinitely. As shown in FIG. 1, there are guiding grooves 16 elongated in each of the recirculation channels 15. A guiding plane H1 is defined by a pair of guiding grooves 16 in the corresponding lead zone channel 14, and a guiding plane H2 defined by the pair of guiding grooves 16 in the corresponding return channel 12. An optimal position of the return channel 12 in the linear guide design is not always on the plane T1, having intersecting the center of the load zone channel 14 and perpendicular to the plane H1. The plane C1 defined by the rolling ball centers in the return channel 12 and in the load zone channel 14 inclines to said plane T1 with an angle $\phi 1$. Therefore, there is a displacement $\Delta$ between the plane T1 and the plane T3 intersecting the rolling ball center in the return channel 12 and having perpendicular to the guiding plane H2 in the return channel 12. As shown in FIGS. 3 and 4, a ball chain 03 runs through the load channel 14, the turnaround channel 13 and the return channel 12; FIGS. 3 and 4 are a front view and other views from various perspectives. The spacing chain 30 of the ball chain 03 comprises a row of spacers 32 arranged between the balls 31. The contact faces 35 of a spacer with adjacent balls are respectively aligned with the balls. The thin longitudinal flexible strips 33, and the multitude of transversely extended flexible connecting beam 34, the strip 33, confined and moving in the guiding grooves 16 of the load zone channel and the connecting beams 34 are laying on the plane H. The G-G perspective view in FIG. 3 shows the orientation of X, Y and Z axes; X is along the moving direction of the ball chain 03, Y is perpendicular to X and on the plane H, and Z is perpendicular to the plane H and Y. The X, Y and Z axes are curved along with the curvature of the guiding grooves 16 in the recirculation channel 15. When the spacing chain 30 is either in the load zone channel 14 or the return channel 12, the longitudinal flexible strips 33 and the transverse flexible connecting beams 34 are mutually perpendicular, whereas the spacers 32 and the transverse flexible connecting beams 34 are parallel to each other. When the spacing chain 30 is turned into the turnaround channel 13, the transverse flexible connecting beam 34 will tilt to the flexible strip 33 form a deflection angle $\phi 3$ around the Z axis as shown in FIGS. 3(A) and 3(B). At the same time, the spacers shall always keep aligned with the adjacent rolling balls; accordingly the spacers 32 and the transverse flexible connecting beams 34 shall twist each other about the Z axis to form an angle $\phi 4$, as shown in the E-E perspective view in FIGS. 4(A) to 4(C). Further, the spacers 32 and the transverse flexible connecting beam 34 shall twist each other about the Y axis to form an angle $\phi 5$, also shown in FIGS. 4(A) and 4(B). Further, the spacers 32 and the transverse flexible connecting beam 34 shall twist each other about the X axis to form an angle $\phi 6$, as shown in the D-D perspective view in FIG. 4. Since the balls 31 and the longitudinal flexible strips 33 are moving in the recirculation channel 15 and parallel to the recirculation channel 15, the angle $\phi 3$ will be the same as another angle $\phi 1$ defined by the intersection of the plane C1 and the plane T1, when the transverse flexible connecting beam 34 is parallel to the guiding plane of the spacing chain H. Further, since the spacers 32 are aligned with the balls 31, the angles φ3 and φ4 are the same. Therefore, the larger the displacement Δ defined by the plane T1 and the plane T3 is, the more necessary the degree of freedom for the spacing chain 30 to tilt to angles φ3 and φ4 is.

Figure 5A:
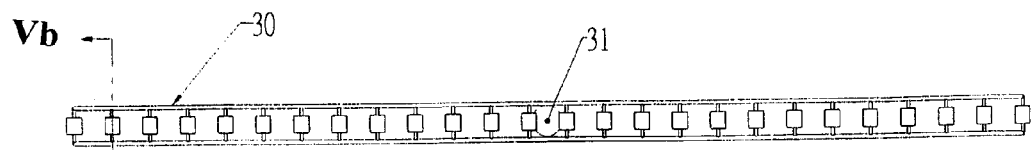
FIGS. 5(A) and 5(F) show the first preferred embodiment of the present invention.
Figure 5B:
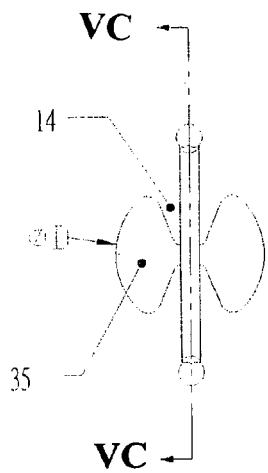
Figure 5C:
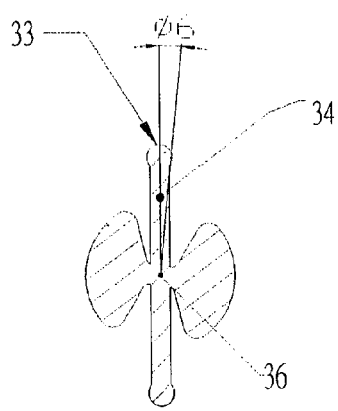
Figure 5D:
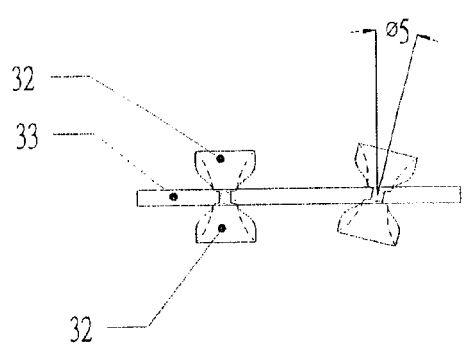
Figure 5E:
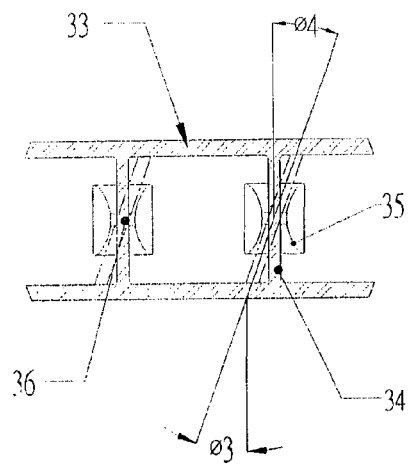
Figure 5F:
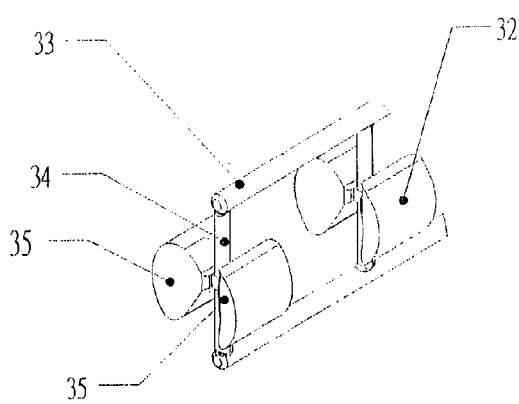

To facilitate the deformation of the spacing chain 30 when it goes into a turnaround channel 13 with low resistance, the first preferred embodiment of the present invention shown in FIGS. 5(A) and 5(F) is a spacing chain 30 comprising a pair of thin longitudinally extended flexible strips 33 and a multitude of transversely extended flexible connecting beams 34, wherein both ends of said connecting beams 34 are connected on the said flexible strip 33, and a corresponding one of the spacers 32. Each of the spacers 32 is interposed between two adjacent balls 31 and has inwardly curved contact faces 35 to accommodate the shape of the balls; the arc of the contact faces 35 is similar to the diameter of the balls 31. The elastic member for the joint of said spacers and said connecting beam 34 is formed by the constriction of the joint area 36 between the spacers 32 and the transverse flexible connecting beam 34 where the joint area is at least smaller than the diameter of the spacers 32, whereby the flexible deflection between the spacers 32 and the transverse flexible connecting beam 34 will be increased. Therefore, the spacers 32 and the transverse flexible connecting beam 34 can undergo a flexible deformation with low resistance as shown in FIGS. 3(A) and 3(B). Such deformation will achieve a tilt angle φ4 about the Z axis, another tilt angle φ5 about the Y axis and a further tilt angle φ6 about the X axis as required. At the same time, the constriction of the joint areas 36 of the present invention enhance the flexibility and preserve the length of the transverse flexible connecting beam 34. On the other hand, the connecting areas 37 between the longitudinal flexible strips 33 and the transverse flexible connecting beam 34 is roughly the same as the cross section area of the longitudinal flexible strips 33, whereby the longitudinal flexible strips 33 and the transverse flexible connecting beam 34 can help achieving flexible deformation and twist about the Z axis to form a tilt angle φ3, whereby the spacing chains 30 of the ball chains 03 can slide smoothly with low resistance along the guiding planes defined by respective guiding grooves in the recirculation channel 15. The size of the joint area 36 depends on the necessary elasticity to form the tilt angle φ3 required.

Figure 6A:
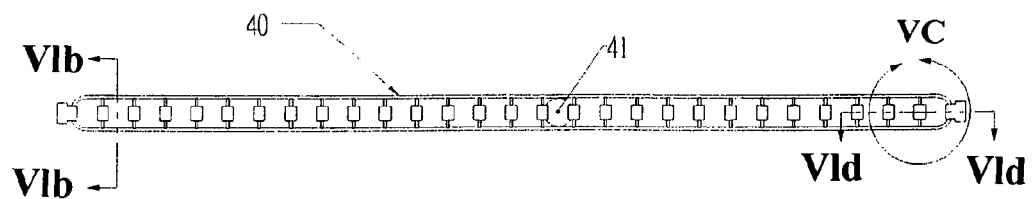
FIGS. 6(A) and 6(E) show the second preferred embodiment of the present invention.
Figure 6B:
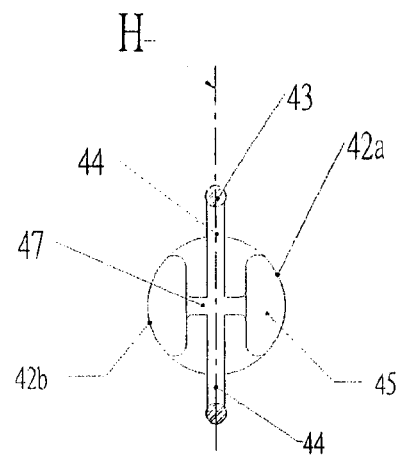
Figure 6C:
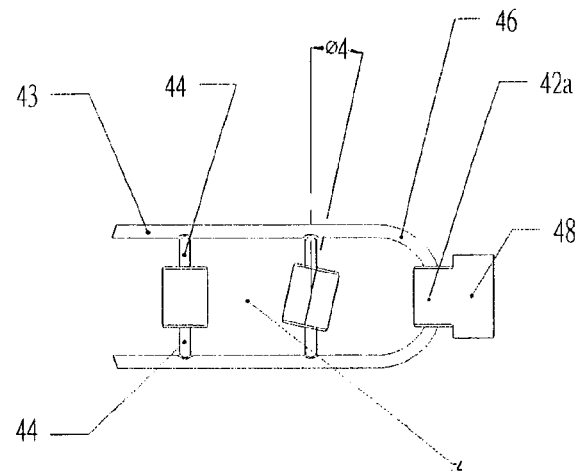
Figure 6D:
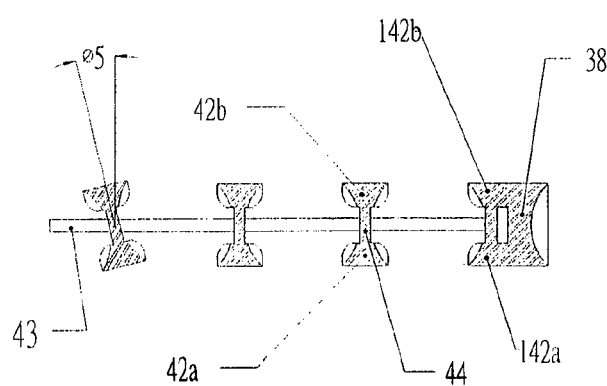
Figure 6E:
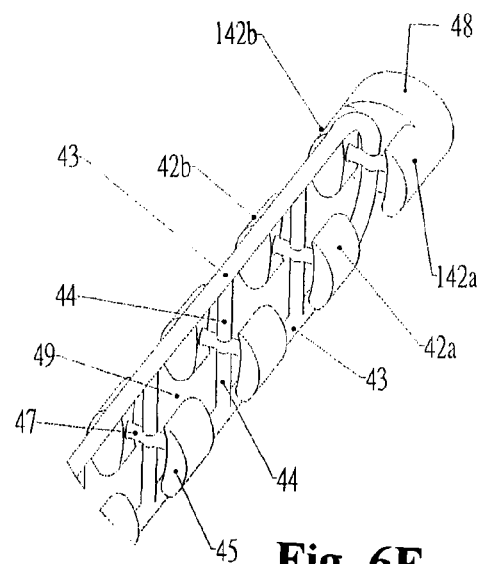

Referring to FIGS. 6(A) and 6(E), the second preferred embodiment of the present invention is a spacing chain 40 of a ball chain comprising a pair of longitudinal flexible strips 43, a multitude of transverse flexible connecting beam 44 and a row of spacers 42 interposed between balls 41. The elastic member 46 for the joint of the spacers 42 and the transverse flexible connecting beam 44 are formed by a flexible transverse stick 47, which pierces the plane H defined by said longitudinal flexible strips 43 and the transverse flexible connecting beam 44. The flexible stick 47 has a joint in the middle connecting with the connecting beam 44. The spacers 42 are divided by the plane H to form a pair of spacer components 42a and 42b, which are connected on both ends of said flexible stick 47. The contact faces 45 between pairs of spacer components 42a and 42b and the balls 41 are arced to fit the shape of the balls 41, whereby the flexible stick 47 can further enhance the flexibility of deformation between the spacers 42 and the transverse flexible connecting beam 44. Therefore, when the spacing chain 40, having its longitudinal flexible strip 43 confined in said guiding groove 16, enters into the turnaround channel 13, the spacers 42 can easily deflect and align to the balls, the resistance is reduced, and the movement of the spacing chain 40 in the recirculation channel 15 can be smooth.

The terminal spacers at two ends of a spacing chain 40 each comprises a pair of spacer pieces 142a, 142b and a connecting piece 48 on which the spacer pieces 142a, 142b are integrated. The holes for receiving the balls 49 between the spacers 42 are each near the size of the balls 41. Therefore, when the receiving holes 49 are all filled with the balls 41, all of the pairs of spacer components 42a and 42b will be confined by the balls 41 and the integrated terminal spacers 142a, 124b, whereby they will not be able to do any unnecessary deflection causing interference with the surrounding of the recirculation channel 15. The terminals of a pair of longitudinal flexible strips 43 are curved toward the balls 41, and therefore the connecting pieces 48 will become the guide pieces for the two ends of the spacing chain 40.

Figure 7A:
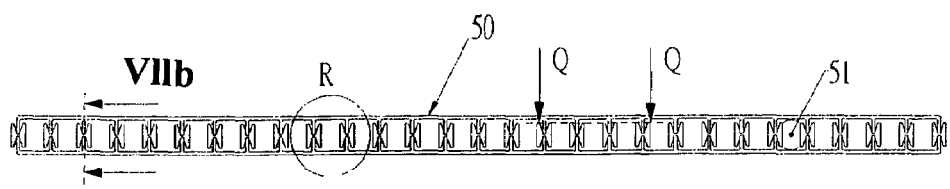
FIGS. 7(A) and 7(F) show the third preferred embodiment of the present invention.
Figure 7B:
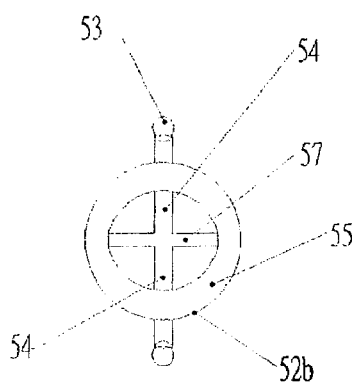
Figure 7C:
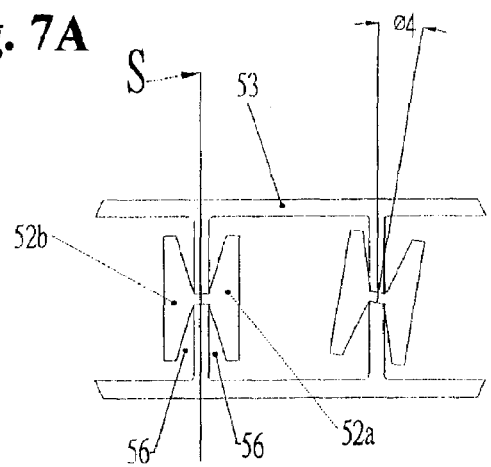
Figure 7D:
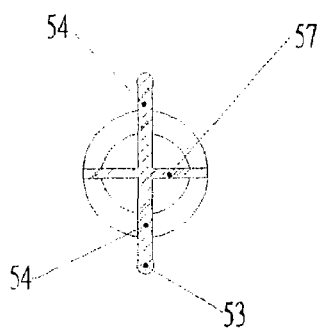
Figure 7E:
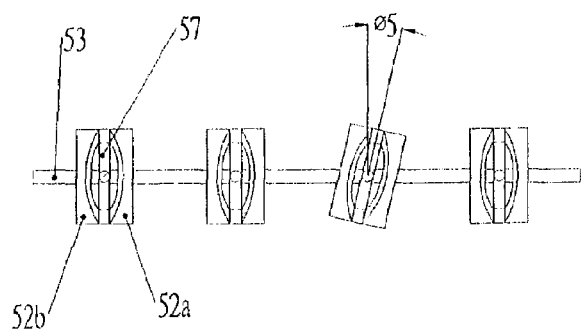
Figure 7F:
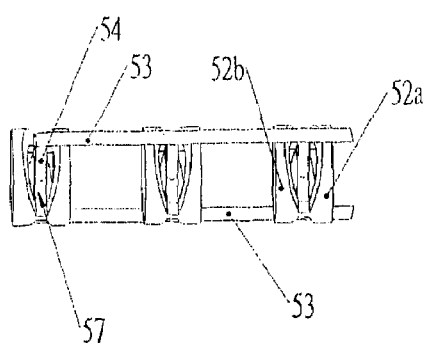

Referring to FIGS. 7(A) and 7(F), the third preferred embodiment of the present invention is a spacing chain 50 of a ball chain comprising a pair of longitudinal flexible strips 53, a multitude of transverse connecting beam 54 and a row of spacers 52 interposed between balls 51; the spacers 52 are connected to the transverse connecting beam 54. Each of the spacers 52 is divided by a plane S, intersecting said transverse connecting beam 54, and perpendicular to the longitudinal flexible strip 50, into a pair of spacer components 52a and 52b which are arranged in tandem longitudinally. The front spacer component 52a is adjacent to a front one of the balls 51, and the rear spacer component 52b is adjacent to a rear one of the balls 51. The contact faces 45 between pairs of spacer components 52a and 52b and the balls 51 are arced to fit the shape of the balls 51. The flexible connection between the spacer components 52a and 52b and the transverse connecting beam 54 are achieved by a flexible transverse stick 57, which pierces the plane H, defined by the longitudinal flexible strips 53 and the transverse connecting beam 54, and connect the pair of spacer components 52a and 52b on both ends. The center of the flexible transverse stick 57 is connected to a corresponding one of the transverse connecting beam 54. The clearance between the transverse flexible connecting beam 54 and the spacer components 52a and 52b are sufficiently large so that the tilting from the spacer components 52a and 52b will not interfere with the transverse flexible connecting beam 54. The transverse stick 57 can further enhance the flexibility of deflection between the spacers 52 and the transverse flexible connecting beam 54. Therefore, when the spacing chain 50, having its longitudinal flexible strip 53 confined in the guiding groove 16, enters into the turnaround channel 13, the spacers 52 can easily deflect and align to the balls, the resistance is reduced, and the movement of the spacing chain 40 in the recirculation channel 15 can be smoothed as shown in FIG. 1.

Figure 8A:
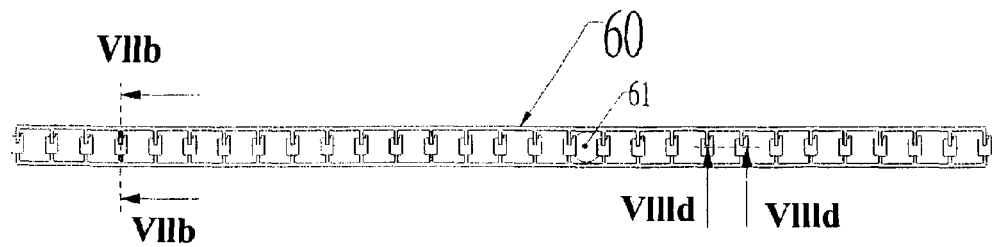
FIGS. 8(A) and 8(F) show the fourth preferred embodiment of the present invention.
Figure 8B:
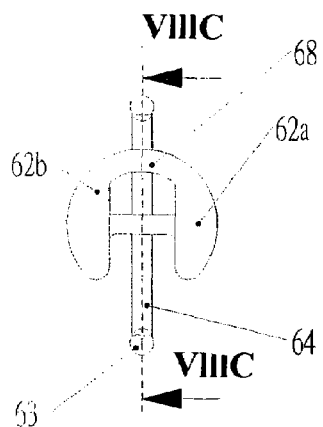
Figure 8C:
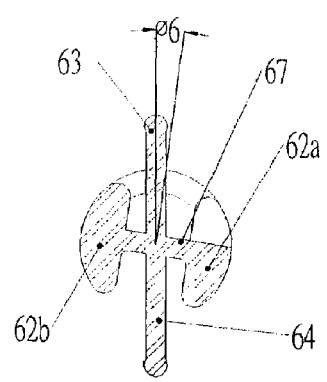
Figure 8D:
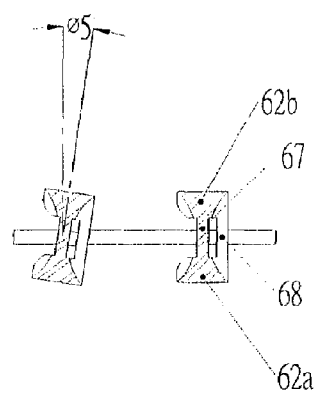
Figure 8E:
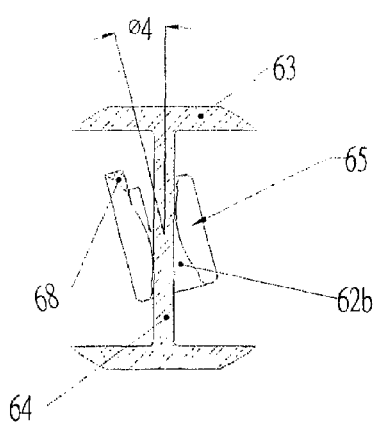
Figure 8F:
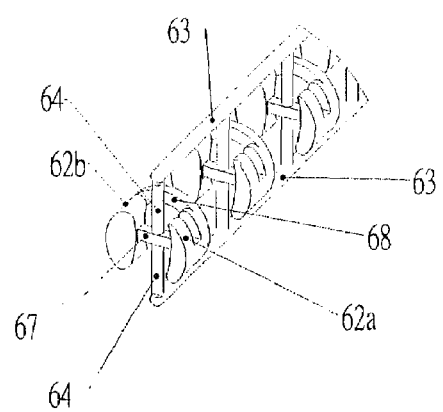

Referring to FIGS. 8(A) and 8(F), the fourth preferred embodiment of the present invention is a spacing chain 60 of a ball chain comprising a pair of longitudinal flexible strips 63, a multitude of transverse flexible connecting beam 64 and a row of spacers 62 interposed between balls 61. The elastic member for the connection between the pair of the spacers 62 and the transverse flexible connecting beam 64 is realized by a flexible transverse stick 67, which pierces a plane H, defined by the longitudinal flexible strips 63 and the transverse flexible connecting beam 64. The flexible transverse stick 67 connects the pair of spacer components 62a and 62b at its two ends and the flexible transverse connecting beam 64 in its middle position. The contact faces 65 of pairs of spacer components 62a and 62b facing the balls 61 are arced so as to fit the shape of the balls 61. To prevent the excessive opening of the spacer components 62a and 62b so that the fringe of them become larger than the cross section area of the balls 61 and they will interfere with the surrounding of the recirculation channel 15, the pair of spacer components 62a and 62b are connected by at least a connecting strip 68. The transverse stick 67 can further enhance the flexibility of deflection between the spacers 62 and the transverse flexible connecting beam 64. Therefore, when the spacing chain 60, having its longitudinal flexible strip 63 confined in said guiding groove 16, enters into the turnaround channel 13, the spacers 52 can easily deflect and align to the balls, the resistance is reduced, and the movement of the spacing chain 40 in the recirculation channel 15 can be smoothed, as shown in FIG. 1.

Figure 9A:
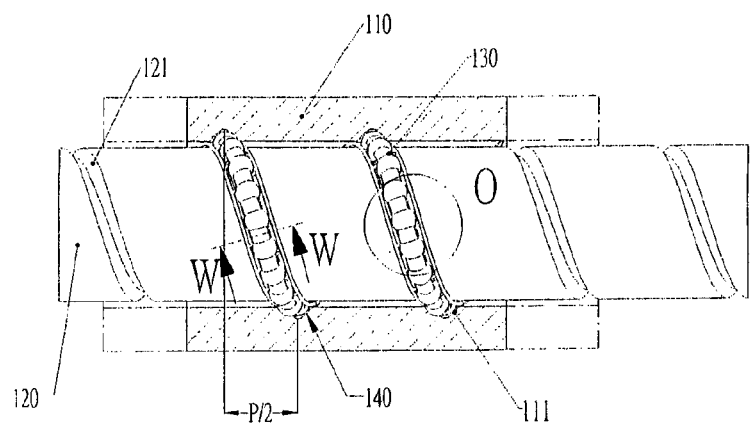
FIGS. 9(A) and 9(F) show the fifth preferred embodiment used in a ball screw design.
Figure 9B:
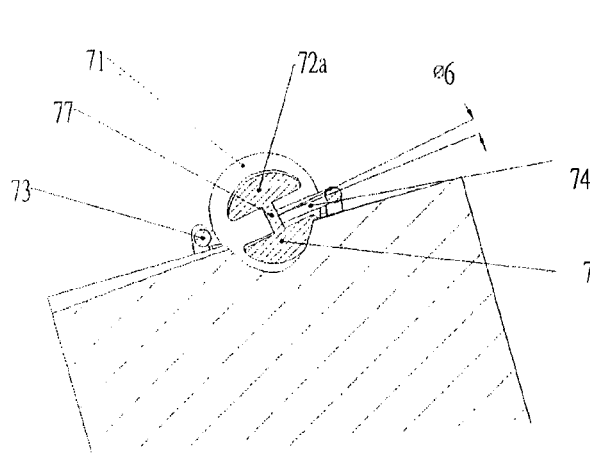
Figure 9C:
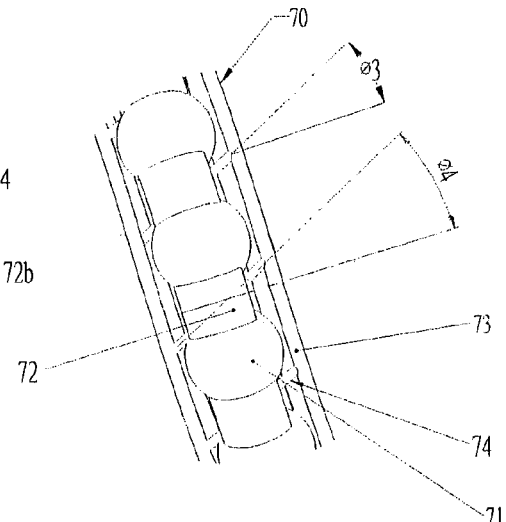
Figure 9D:
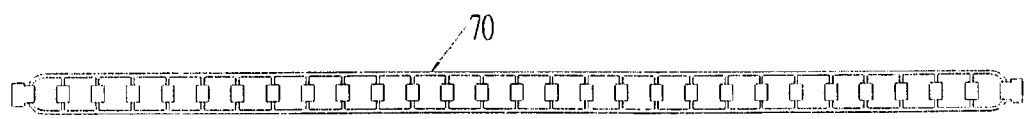

Referring to FIGS. 9(A) and 9(F), a ball screw comprises a moving part 110 being a hollow cylindrical nut, a guide rod 120 and at least one balls chain 130 helically wound about the guide rod 120. The inner wall of the moving part 110 is provided with a least a helically extended track 111, and the outer wall of the guide rod 120 is provided with at least a corresponding helical track 121, whereby the coupling between the tracks 111, 121 forms a load zone channel 140 helically extended along the axis of the guide rod 120. The balls chain 130 comprises a row of balls 71 and the associated spacing chain 70, which is basically the first preferred embodiment of the present invention. The spacing chain 70 is provided with a row of holes for receiving a corresponding one of the balls 71, whereby they are separated and properly retained. When the moving part 110 is being rotated, the balls chain 130 will move along the helical track 121, and therefore the moving part 110 will proceed in the axial direction of the guide rod 120. The spacing chain 70 is in a straight line shape, wherein the transverse flexible connecting beams 74 are perpendicular to the longitudinal flexible strip 73, when it is free. The spacing chain 70 is wound into a helical shape when it is in a load zone channel 140 and the longitudinal flexible strips 73 are confined between the moving part 110 and the outer surface of the guide rod 120 and together with the balls 71 move along the helically extended track 111, 121. This situation is the same as a ball chain 30 entering into a turnaround channel 13 shown in FIG. 3, the plane perpendicular to the guiding plane of the helical load zone channel 140, defined by the pair of longitudinal flexible strip 73 or the outer surface of the guide rod, is thereof not on the same plane. Therefore the transverse flexible connecting beams 74 will tilt with respect to the longitudinal flexible strip 73 at an angle φ3; in the meanwhile the spacers 72, aligned with the balls 51 are parallel to the longitudinal flexible strips 73, the pair of the spacer components 72a, 72b, shall tilt with respect to the transverse flexible connecting beam 74 at angles φ4, which two angles φ3, φ4 will increase in accordance with the increase in lead pitch of the helical extended track 111, 121. The spacing chain 70 the same as the spacing chain 40 shown in FIG. 6, having the flexible stick 77 as elastic member, has the flexibility of deformation between the spacers 72 and the transverse flexible connecting beam 74. Therefore, the spacers 72 and the corresponding transverse flexible connecting beam 74 may form a tilt angle φ4. Further, since the connecting areas 76 are much smaller than the cross section areas of the spacers 72, the length of the transverse flexible connecting beam 74 is effectively increased. Further, the flexibility of the longitudinal flexible strips 73 and the transverse flexible connecting beam 74 enable the tilt to form a tilt angle φ3 between the longitudinal flexible strips 73 and the transverse flexible connecting beam 74. Therefore the spacing chain 70 together with the balls 71 can move in the helical extended load zone channel 140 smoothly under low resistance.

The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A ball chain, comprising: a longitudinal elongated spacing chain and a row of balls; said spacing chain further comprising a pair of parallel thin flexible strips longitudinally extended along with said spacing chain and a multitude of transverse flexible connecting beam linked to said thin flexible strips; the spacing chain being provided with a row of holes for receiving a corresponding one of the balls;

a row of spacers interposed between each two adjacent balls for isolating said balls, said spacers having a connection with said flexible connecting beam, wherein the connection is constrict and at least smaller than the cross sectional area of said spacers; and wherein a joint area between the spacers and the transverse flexible connecting beam is formed with an elastic member for the joint of the said spacers and said connecting beam; the joint area is at least smaller than a diameter of the spacers so that the flexible deflection between the spacers and the transverse flexible connecting beam will be increased.

2. The ball chain of claim 1 wherein the constricted connection of said spacers with said flexible connecting beam is formed by a flexible stick, which pierces the plane defined by said longitudinal flexible strip and transverse flexible connecting beam; two ends of said flexible stick each being connected to corresponding spacers.

3. The ball chain of claim 1 wherein said spacers connected to said flexible stick are divided into an upper spacer component and a lower spacer component by the plane defined by said longitudinal flexible strip and transverse flexible connecting beam.

4. The ball chain of claim 3 wherein said independent upper spacer component and lower spacer component respectively have concave contact surfaces fitting adjacent balls.

5. The ball chain of claim 3 wherein two terminals of said spacing chain each have a connecting piece integrating the front-end and rear-end pair of said upper spacer components and lower spacer components.

6. The ball chain of claim 3 wherein said pair of independent spacer components connected to two ends of a corresponding said flexible stick are linked together by a connecting strip.

7. The ball chain of claim 1 wherein said spacers connected to each of said flexible stick are each divided by the plane defined by said flexible connecting stick and said transverse connecting beam into a left spacer component and a right spacer component, each being adjacent to only one rolling ball.

8. The ball chain of claim 7 wherein said independent left spacer component and right spacer component respectively have concaved contact surfaces fitting adjacent balls.

9. The ball chain of claim 1 wherein connection between said transverse flexible connecting strips and longitudinal flexible strips has a connecting area close to the cross-sectional area of each of said flexible strips.

\* \* \* \* \*